US 6,707,486 B1

(12) United States Patent
Millet et al.

(10) Patent No.: US 6,707,486 B1
(45) Date of Patent: Mar. 16, 2004

(54) DIRECTIONAL MOTION ESTIMATOR

(75) Inventors: Ed Millet, Lake Forest Park, WA (US);
Charlene Kelley, Woodinville, WA (US); Eric McRae, Port Townsend, WA (US)

(73) Assignee: Advanced Technology Video, Inc., Redmond, WA (US)

( * ) Notice: Subject to any disclaimer, the term of this patent is extended or adjusted under 35 U.S.C. 154(b) by 0 days.

(21) Appl. No.: 09/464,221

(22) Filed: Dec. 15, 1999

(51) Int. Cl.[7] .................................................. H04N 7/18
(52) U.S. Cl. ....................... 348/155; 348/154; 348/152; 348/169; 348/171; 348/172; 375/240.16; 340/541; 250/342; 250/559; 250/340
(58) Field of Search ................................ 348/169–172, 348/155, 154, 413, 159, 150, 161, 143, 152, 153, 699; 375/240, 240.16; 340/549, 556; 250/559, 340, 342

(56) References Cited

U.S. PATENT DOCUMENTS

| 4,249,207 A | * | 2/1981 | Harman et al. | ............. 348/152 |
| 4,458,266 A | * | 7/1984 | Mahoney | ................... 348/155 |
| 4,661,849 A | | 4/1987 | Hinman | |
| 4,864,393 A | * | 9/1989 | Harradine et al. | .......... 348/699 |
| 4,943,800 A | * | 7/1990 | Ikeda et al. | .................. 340/567 |
| 5,291,020 A | * | 3/1994 | Lee | ............................. 250/342 |
| 5,510,856 A | * | 4/1996 | Jung | ........................... 348/699 |
| 5,666,157 A | * | 9/1997 | Aviv | ........................... 348/152 |
| 5,712,681 A | | 1/1998 | Suh | |
| 5,819,124 A | | 10/1998 | Somner et al. | |
| 5,901,248 A | | 5/1999 | Fandrianto et al. | |
| 5,998,780 A | * | 12/1999 | Kramer | ...................... 340/555 |
| 6,069,655 A | * | 5/2000 | Seeley et al. | ............... 348/154 |
| 6,125,145 A | * | 9/2000 | Koyanagi et al. | ...... 375/240.16 |
| 6,215,519 B1 | * | 4/2001 | Nayar et al. | ................. 348/159 |

* cited by examiner

Primary Examiner—Shawn An
(74) Attorney, Agent, or Firm—Christensen O'Connor Johnson Kindness PLLC

(57) ABSTRACT

An alarm system automatically monitors activity and directional motion in a predetermined area. When the system detects a particular movement in an area, an alarm is triggered which ultimately notifies a system operator or allows the system to initiate some other automated activity. The system detects movement by comparing changes in the center of mass of objects captured in sequential video image frames. In addition, filters may be added to decrease the number of false alarms. Specifically, the alarms may only be generated if the system detects movement in a particular direction and if the moving object detected by the video camera is of a particular size. The system comprises a video camera, a video display, and a processing unit. The processing unit comprises a bus interface that connects a central processor (CPU), computer memory (RAM and ROM), a video processing unit, a video output unit, and an input interface unit.

4 Claims, 15 Drawing Sheets

DIRECTIONAL MOTION ESTIMATOR

FIELD OF THE INVENTION

The present invention generally relates to a method and system for detecting motion, more particularly, to motion detectors capable of estimating the direction of moving objects.

BACKGROUND OF THE INVENTION

Motion sensors for security systems are well known in the prior art. Generally, these systems automatically trigger an alarm when a motion sensing device detects a moving object within a specific area. The most common type of motion sensing devices are infrared detectors or video display apparatus.

When an infrared detector is used in an alarm system, the system is able to detect almost any movement in a specific area. Infrared detector technology is best for applications where an alarm system is to detect the presence of an object. However, infrared sensors have limited capabilities when an alarm system is used for functions outside of detecting the presence of an object. For example, if an infrared sensor were used to monitor an entrance of a building, the alarm would trigger every time a person passed through the sensing area. In this application, the alarm system would only be useful in monitoring the building entrance at night or at times of low traffic. In a situation where an alarm system operator is only concerned with persons entering a building, and not concerned with persons leaving the building, the use of an infrared detector is undesirable because it cannot distinguish the direction of objects moving in its field of view.

Other alarm system designs involve the use of a video camera and a video processing means. This design can be used in a number of different ways. In one design, the camera can be used in conjunction with a video monitor. For example, the camera can be directed to a passageway and the video image of that passageway is simply displayed on the video display. This design requires an operator to constantly watch the activity displayed on the monitor at all times. Thus, this arrangement is beneficial for situations where an operator desires to record the activity captured by the video camera or in situations where an operator only requires low level of security. However, this design does not work well in situations where an operator requires a high level of security. A security breach may occur if the operator does not constantly observe the video display. A design involving a video recorder has other disadvantages when applied to alarm monitoring systems. For example, even if the monitoring system records the activity viewed by the camera, a security breach can only be detected at a later time when the video tapes are reviewed under close inspection.

Other designs of alarm systems utilizing a video camera may also include a video processing unit. In this case, the video camera sends an analog video signal to a video processing unit that digitizes the images and stores them as a series of video image frames. The processing unit then compares each digitized video image frame and detects changes in the contrast or the image brightness between each successive frame. Much like the infrared detector, these type of alarm systems have the capability to detect general motion and have the same disadvantages when used to monitor high traffic areas.

Given these shortcomings, there is a need for a motion sensing system that can determine the direction of motion in a field of view and does not require continual monitoring by a human operator.

SUMMARY OF THE INVENTION

The present invention provides an alarm system to automatically monitor activity in a predetermined area. When the system detects movement in a predetermined area, an alarm is triggered which ultimately notifies a system operator or allows the system to initiate some other automated activity.

The alarm system detects the direction of a moving object by receiving a number of video image frames from a video camera that is positioned to view an area of interest. A processing unit then calculates a center of mass from data in each of the video image frames and then determines if the position of the center of the mass is changing. If the center of mass has changed in the video image frames, an alarm is generated to indicate a movement. Filters may be added to the system to reduce the number of false alarms. Specifically, the alarms may only be generated if the system detects movement in a particular direction by more than a predetermined amount or if the moving object detected by the video camera is of a particular size.

The system comprises a video camera, a video display, and a processing unit. The processing unit comprises a bus interface that connects a central processor (CPU), computer memory (RAM and ROM), a video processing unit, a video output unit, and an input interface unit. The processing unit receives video signals from a video camera and digitizes each of the video image frames. By the method of the present invention, the CPU detects the difference between subsequent video frames and calculates the center of mass of the differences. If the center of mass moves by more than a predetermined amount, an alarm is generated.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
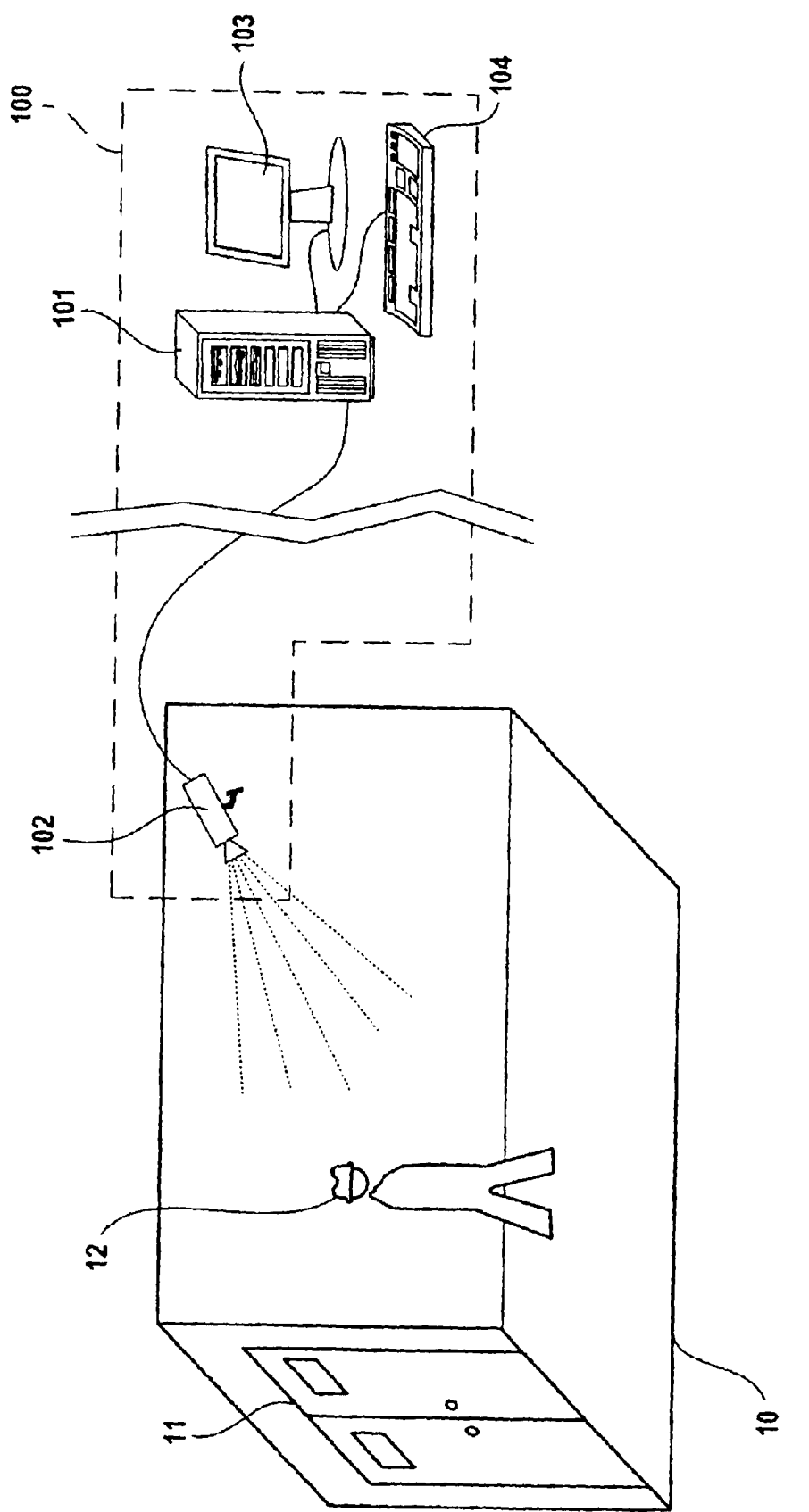
FIG. 1 a schematic diagram of a directional motion sensing system constructed in accordance with one embodiment of the present invention.

FIG. 1 is a perspective view of one embodiment of a directional motion sensing system 100 used to implement the processes of the present invention. In this embodiment, a video camera 102 is positioned to monitor a number of people 12 or other objects moving in the passageway 10. The video camera 102 transmits the captured video images to a processing unit 101 located in a remote area where the sensing system could be monitored by an operator (not shown) or used to control other automated security system devices (not shown).

The motion sensing system of the present invention allows the processing unit 101 to automatically monitor the activity in the passageway 10. In addition, the system has the capability to identify objects moving in a particular direction. When the processing unit 101 detects movement in a particular direction within the passageway 10, an alarm (not shown) is triggered by the processing unit 101, which ultimately notifies the operator or allows the processing unit 101 to initiate some other automated activity.

Figure 2:
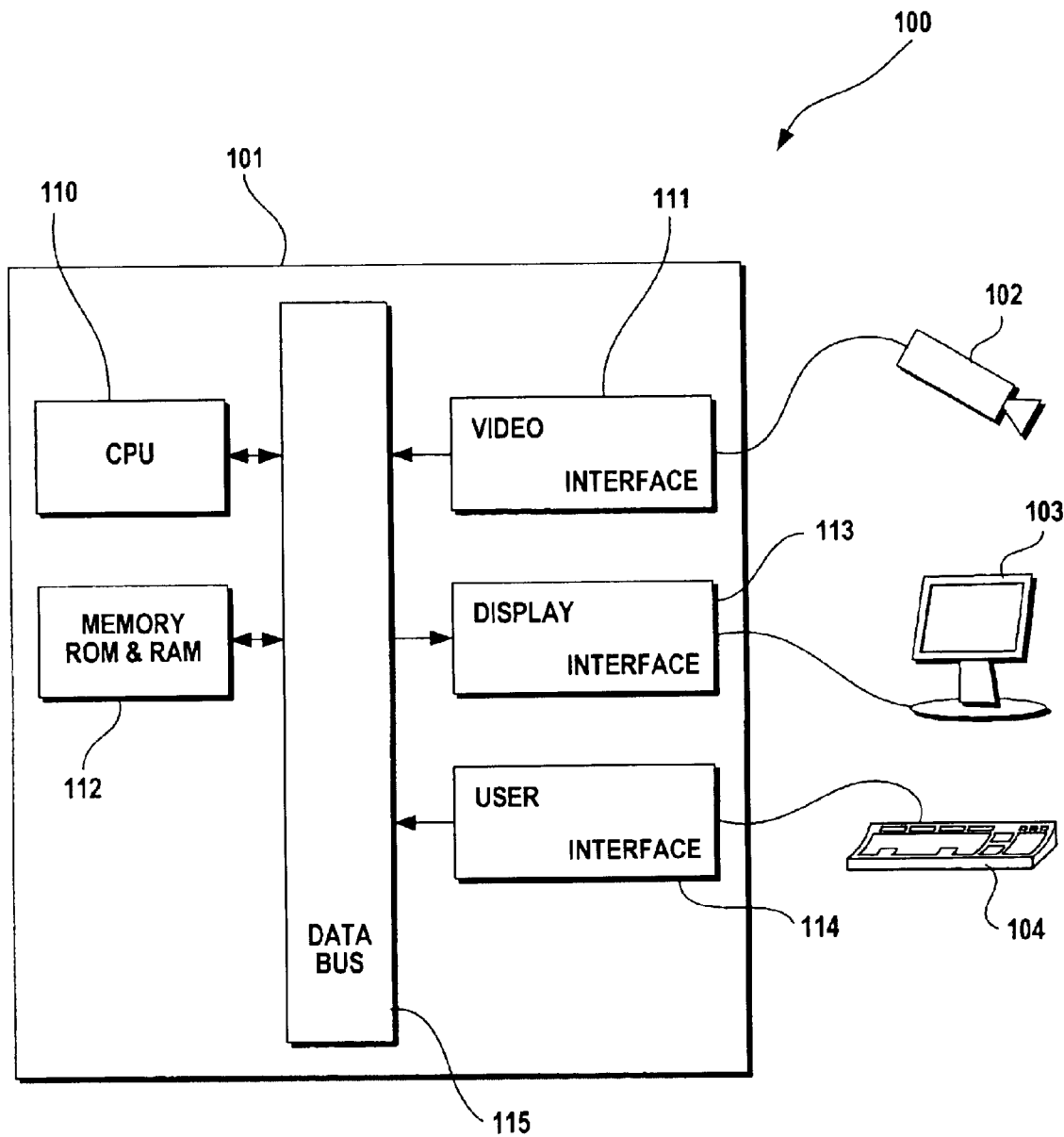
FIG. 2 is a block diagram of a processing unit that is part of the directional motion sensing system of the present invention.

FIG. 2 is a block diagram of the components that comprise the processing unit 101. The processing unit 101 includes a bus interface 115 that connects a central processor (CPU) 110, a computer memory 112 (RAM and ROM), a video processing unit 111, a video output unit 113, and an input interface unit 114. The components housed in the processing unit 101 are conventional computer components generally used in digital image processing. All of the components act in concert to implement the method of the present invention.

The system and method of the present invention provide two types of detection capabilities: activity detection and directional motion detection. Activity detection involves the detection of objects moving in any direction. Motion detection involves the detection of objects of a certain size moving in a specific direction. The process that determines the presence of each type of motion is described below. The description of each process also describes the benefits of each type of detection.

Activity detection involves the detection of any movement in a camera's viewing area. More specifically, if an object moves up, down, right or left, the motion detection system 100 recognizes that particular movement and can produce a signal used to generate an alarm. The process for detecting this type of motion involves sampling a series of video image frames and comparing pairs of successive video image frames for variances.

Figure 3A:
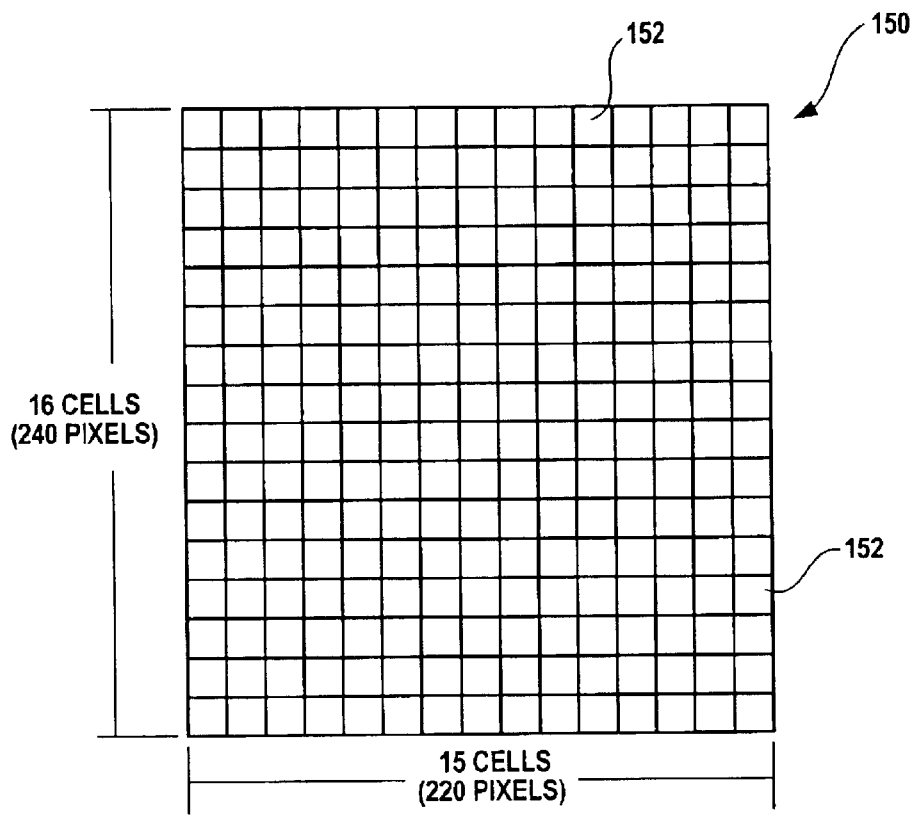
FIG. 3A is diagram of a representative video image frame consisting of a plurality of cells.
Figure 3B:
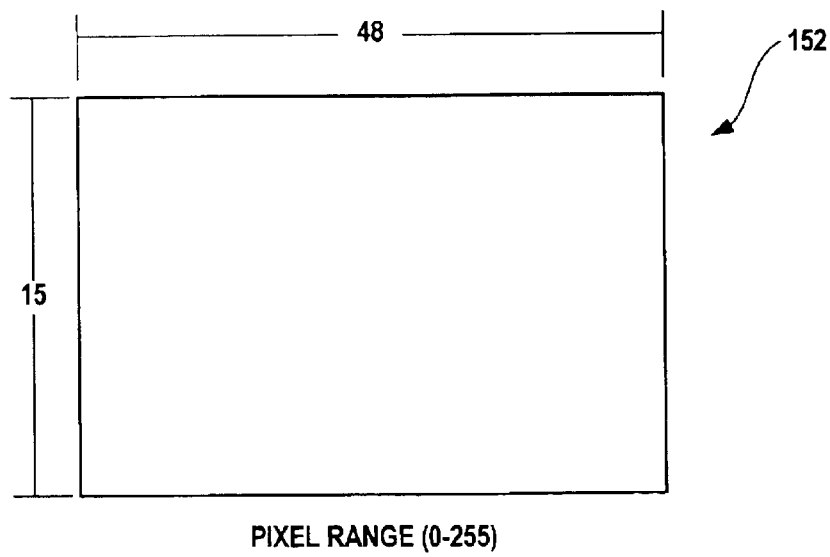
FIG. 3B is a diagram of one cell in a video image frame consisting of a plurality of pixels.

To optimize the performance of the motion detection system, the video image frames are sampled at a rate between two or three frames per second. In addition, the video image frames are digitized and segmented into a specific number of cells. FIG. 3A is diagram of one video image frame 150 that is divided into individual cells 152. In the example shown, the video image frame 150 consists of two hundred forty cells arranged into 15 columns and 16 rows. Further, as shown in FIG. 3B, each cell 152 is comprised of a number of individual image pixels (not shown). In a presently preferred embodiment of the invention, each cell comprises 720 pixels that are arranged in 48 columns and 15 rows. The brightness of each pixel is valued depending on the resolution of the image processor that digitizes the video signals from the video camera. For eight-bit resolution, each pixel has a brightness value in the range of sixteen to two hundred fifty-three.

This embodiment of the present invention detects activity between two consecutive video image frames by first calculating the average pixel value for each cell 152. As each video image frame 150 is processed, the processing unit 101 calculates the average brightness value for each cell 152 in each video image frame. The average brightness value for each cell 152 is calculated by simply summing the brightness values for all of the pixels in the cell 152 and then dividing that sum by the umber of pixels in the cell. As the average brightness values are calculated for each cell 152, the values are stored in the memory 112.

Figure 4:
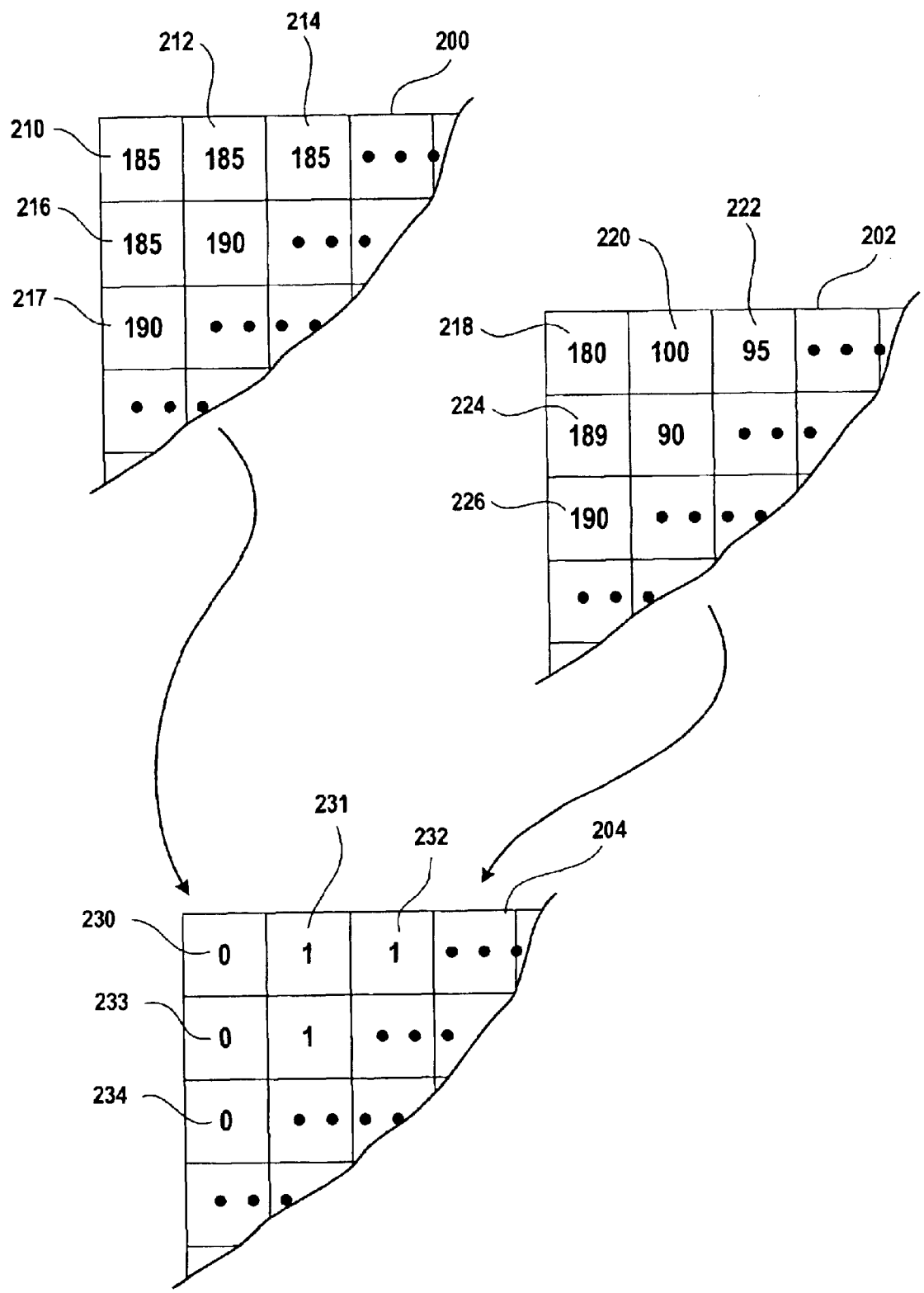
FIG. 4 is an illustration of two partial video image frames and one partial activity sample.

After the processing unit 101 has calculated the brightness averages for at least two video image frames, the processing unit 101 compares the average brightness values between the two sampled video image frames by subtracting the average brightness values of corresponding cells in each video image frame. If two corresponding cells have a difference of ten in the brightness averages, a flag is set for those cells. Although a threshold value of ten is used in this embodiment, threshold value can range from one to ninety-nine depending on the desired sensitivity level. As the brightness averages of each cell of the first and second video image frame are compared, the flags for each comparison are stored in the memory 112, thus building an array of binary valued flags. A complete array of flags is called an activity sample. Although this embodiment uses differences in the pixel brightness levels, other pixel values, such as a color value, may be used to distinguish clusters of pixels. FIG. 4 illustrates in further detail how an activity sample is computed.

FIG. 4 illustrates a portion of a first video image frame 200, a second video image frame 202, and a corresponding activity sample 204. The process starts by building an activity sample and then comparing the average pixel intensity of a first cell 210 of the first video image frame 200 with the average pixel intensity of a first cell 218 of a second video image frame 202. In the example shown, a comparison of these two corresponding cells having pixel intensities of 185 and 180 respectively differ by 5. Thus, a flag is not set for the corresponding cell 230 in the activity sample 204. The process is continued for the remaining cells in the two video image frames 200 and 202, thus generating a complete array of flags in the activity sample 204.

After one activity sample 204 is generated, processing unit 101 can then determine if any movement has been captured in the two video image frames 200 and 202. If the processing unit 101 detects at least one cluster of set flags, the processing unit 101 determines that there was movement between the two video image frames 200 and 202. More specifically, in order to detect motion in an activity sample, a cluster of set flags must comprise a predetermined number of set flags in a row or column in an activity sample.

For example, in one embodiment, if the processing unit 101 detects at least three set flags in a cluster having a width of at least two cells in the horizontal direction or a height of at least two cells in the vertical direction, the processing unit 101 will indicate a detected movement. This way, the system will not indicate that there was a movement unless there is movement from a large object. This size parameter can be changed to accommodate different environments to further reduce the number of false alarms. For example, a user might configure the system to trigger an alarm only if the moving object creates at least four set flags in the horizontal direction or at least four set flags in the vertical direction.

In addition to activity detection, the present invention also provides a method for directional motion detection. The method for directional motion detection adds another process layer that allows the directional motion sensing system 100 to detect motion in specific directions. More specifically, the processes of the present invention provide the capability to filter different types of movement so the system can be used to detect whether an object moves in a horizontal or vertical direction within a video image frame. The system can also be configured to detect whether an object is moving in a left, right, up or down direction. This way, an operator can set the system to only trigger an alarm when the system detects a specific movement. For example, referring to the illustration in FIG. 1, the system can be set to allow a person 12 to move in a direction away from the video camera 102 and towards an exit 11 without triggering an alarm. At the same time, the system can be set to trigger an alarm when the person 12 enters the door 11 and moves down the passageway 10 towards the video camera 102.

Figure 5A:
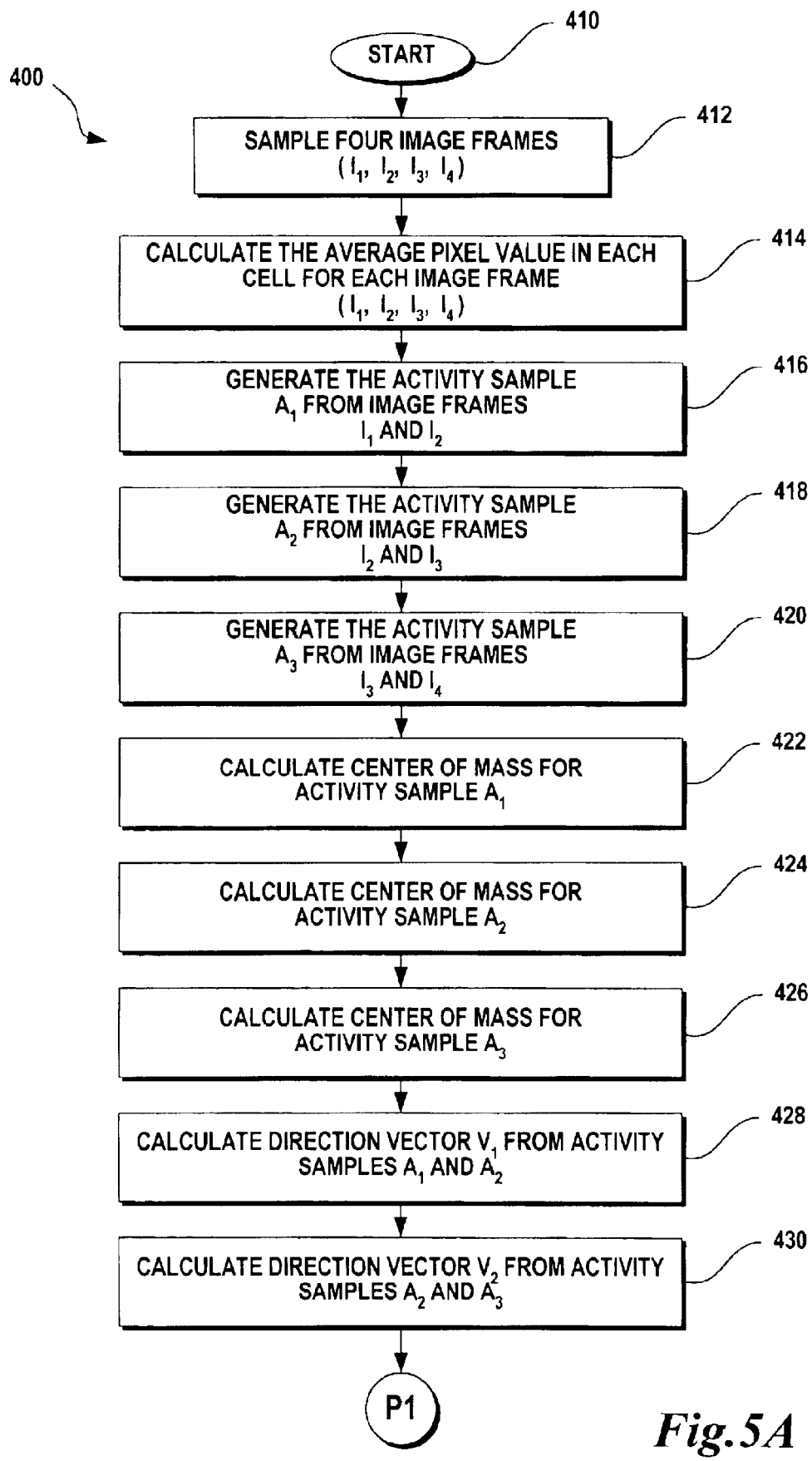
FIGS. 5A–5C are flow diagrams of a process for detecting directional motion according to one embodiment of the present invention.
Figure 5B:
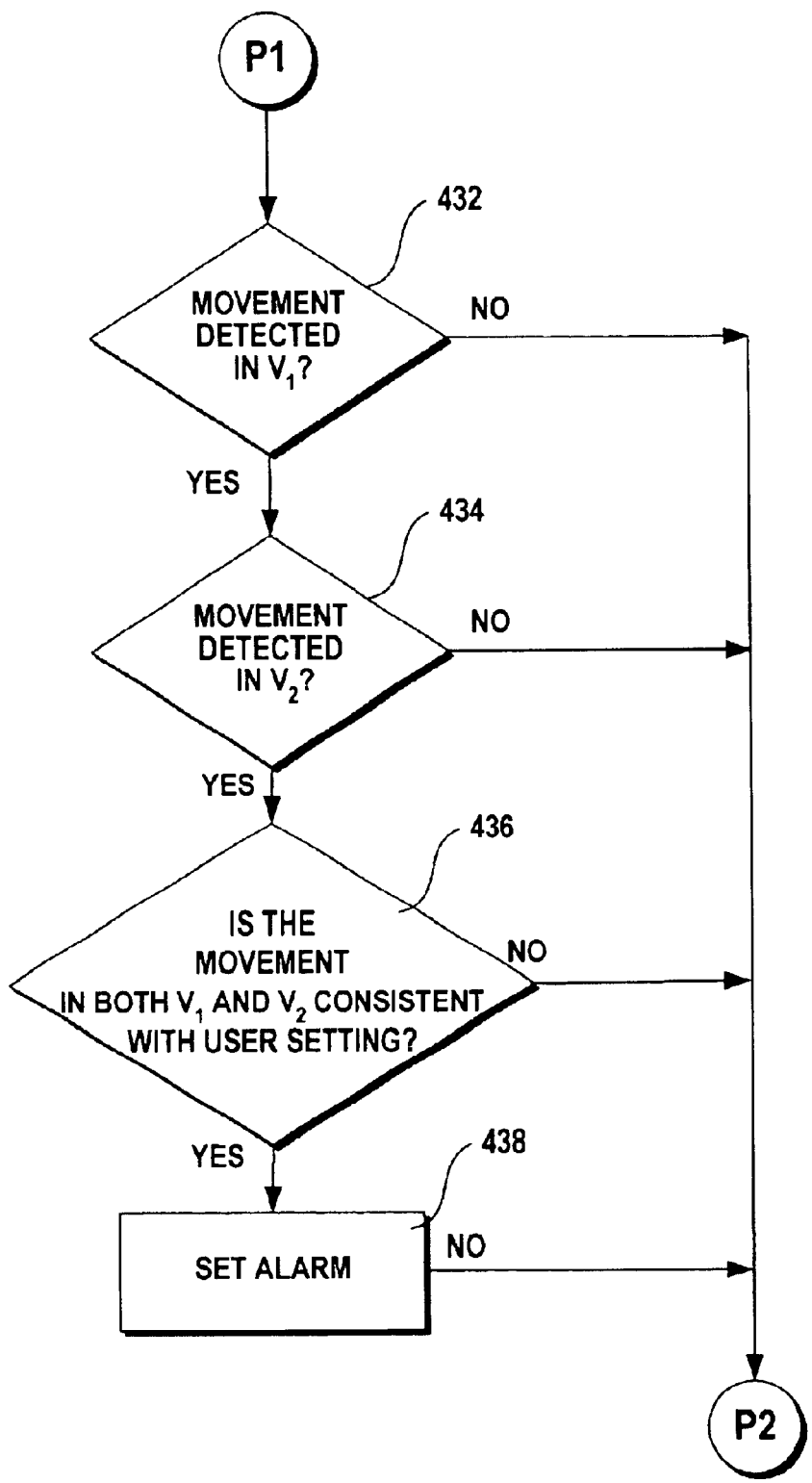
Figure 5C:
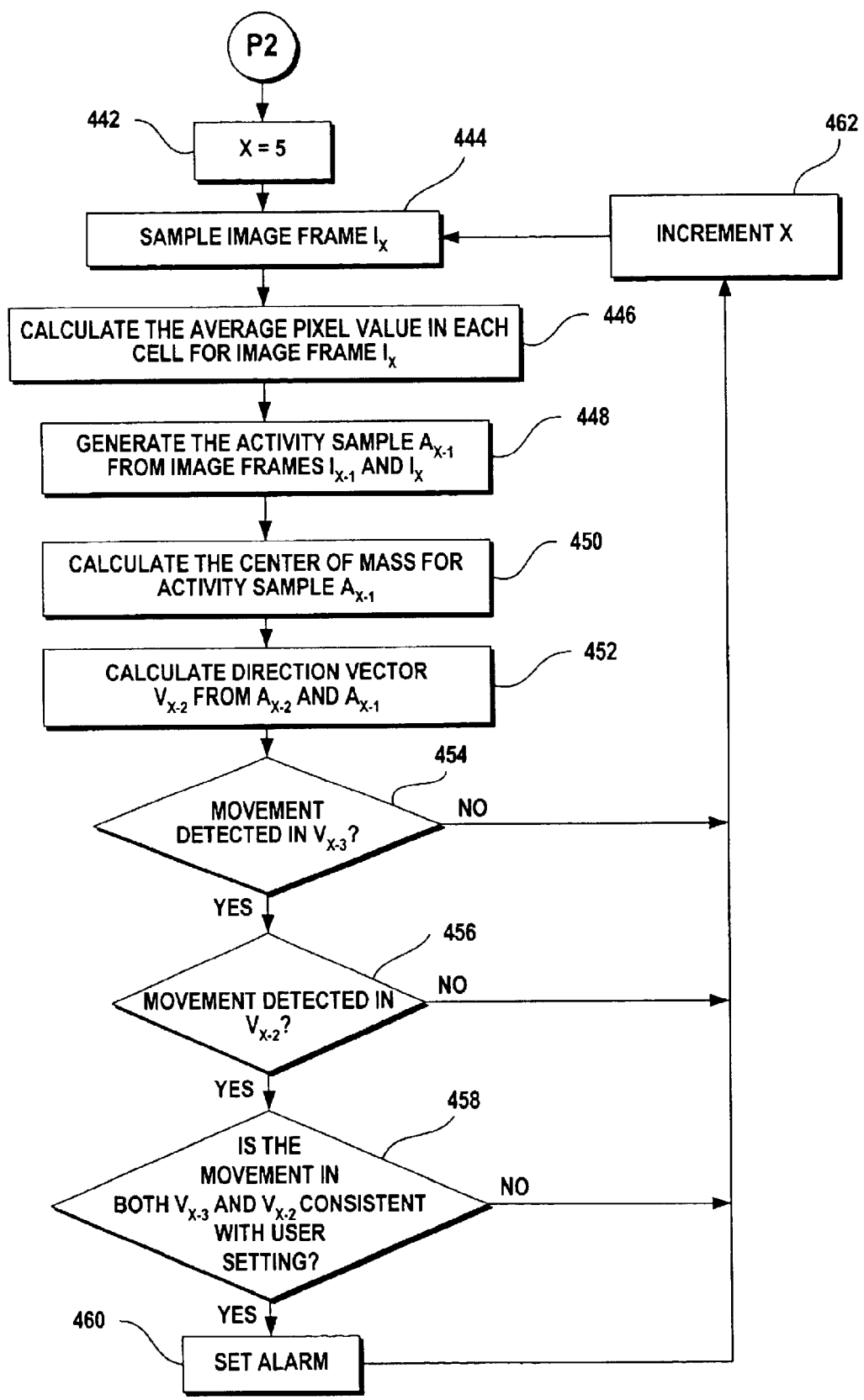

FIG. 5A–5C illustrates one embodiment of the method of detecting directional motion according to the present invention. The process for detecting directional motion requires the system to capture and digitize a series of video image frames. Similar to the process for general activity detection, the system then generates activity samples from at least two video image frames. Next, the system determines the center of mass of the moving objects found in each activity sample. The system then uses the center of mass points to generate vector frames which in turn, reveal the direction of movement.

Figure 6:
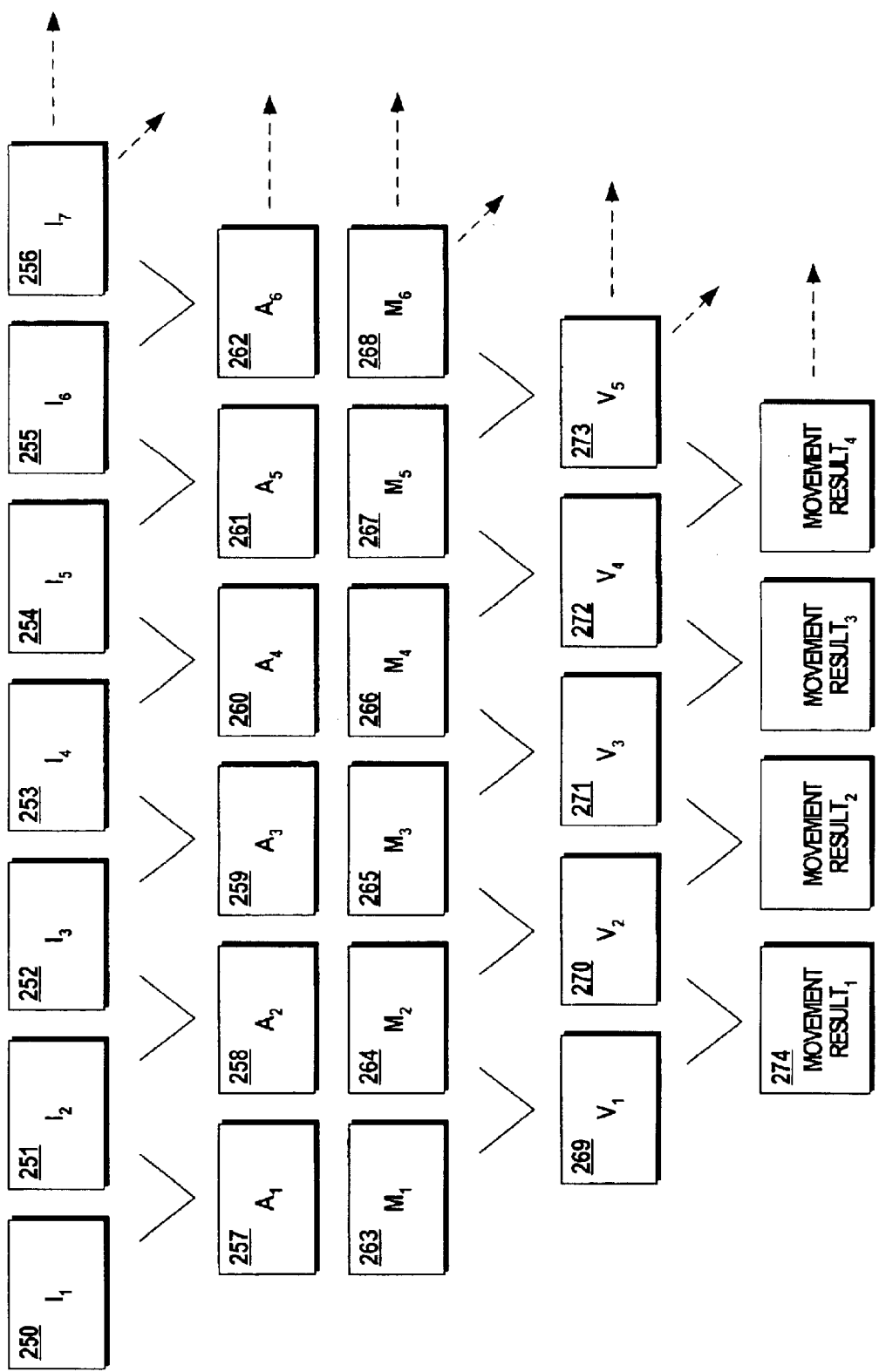
FIG. 6 illustrates how a series of video image frames, activity samples, and vector samples are used to calculate movement in accordance with an embodiment of the present invention.

Beginning with a step 412, the directional motion sensing system should preferably capture four sequential video image frames 250–253 (shown in FIG. 6). Once all four video image frames 250–253 are captured and digitized from the video camera, the process continues at a step 414 where the processing unit 101 then calculates the average pixel brightness value for each cell in each video image frame 250–253. The calculation for the average pixel brightness is carried Out in the same manner as described above.

Next, as shown in steps 416–420, the processing unit 101 then generates the activity sample frames from the sequence of video image frames 250–253. For example, a first activity sample 257 is created by comparing the first two video image frames 250 and 251, and the second activity sample 258 is created by comparing the second and third video image frames 251 and 252. Each consecutive activity sample frame is generated by comparing each subsequent video image frame with the previous video image frame. The method of generating activity sample frames in steps 416–420 is carried out in a substantially similar manner as the above-described method explained in relation to FIG. 4.

Once the activity sample frames have been generated for the first four video image frames 250–253, the process then proceeds with the steps 422–426 where the processing unit 101 then calculates the center of mass values (shown as blocks 263–265 in FIG. 6) for each of the activity sample frames 257–259.

The center of mass values 263–265 for the activity sample frames 257–259 can be determined by the following formulas:

$$M_X = \frac{\left[\sum_{X=1}^{MAX\,X}\left[\left(\begin{array}{c}\text{Number of Active}\\ \text{Bits in Column X}\end{array}\right) \cdot X \cdot \text{Displacement Factor}\right]\right]}{\left[\sum_{X=1}^{MAX\,X}\left(\begin{array}{c}\text{Number of Active}\\ \text{Bits in Column X}\end{array}\right)\right]}$$

$$M_Y = \frac{\left[\sum_{Y=1}^{MAX\,Y}\left[\left(\begin{array}{c}\text{Number of Active}\\ \text{Bits in Row Y}\end{array}\right) \cdot Y \cdot \text{Displacement Factor}\right]\right]}{\left[\sum_{Y=1}^{MAX\,Y}\left(\begin{array}{c}\text{Number of Active}\\ \text{Bits in Row Y}\end{array}\right)\right]}$$

Here, X and Y respectfully represent the row and column positions for the cells in an video image frame. The displacement factor is a multiplying factor that is added to the process to accommodate CPU's that do not efficiently process floating point calculations. Thus, the displacement factor can be optionally used to increase the accuracy of the calculation. A desired value for the displacement factor is eight. The value of MAX applies to the maximum number of rows and columns to be analyzed in the activity sample frame.

Figure 7:
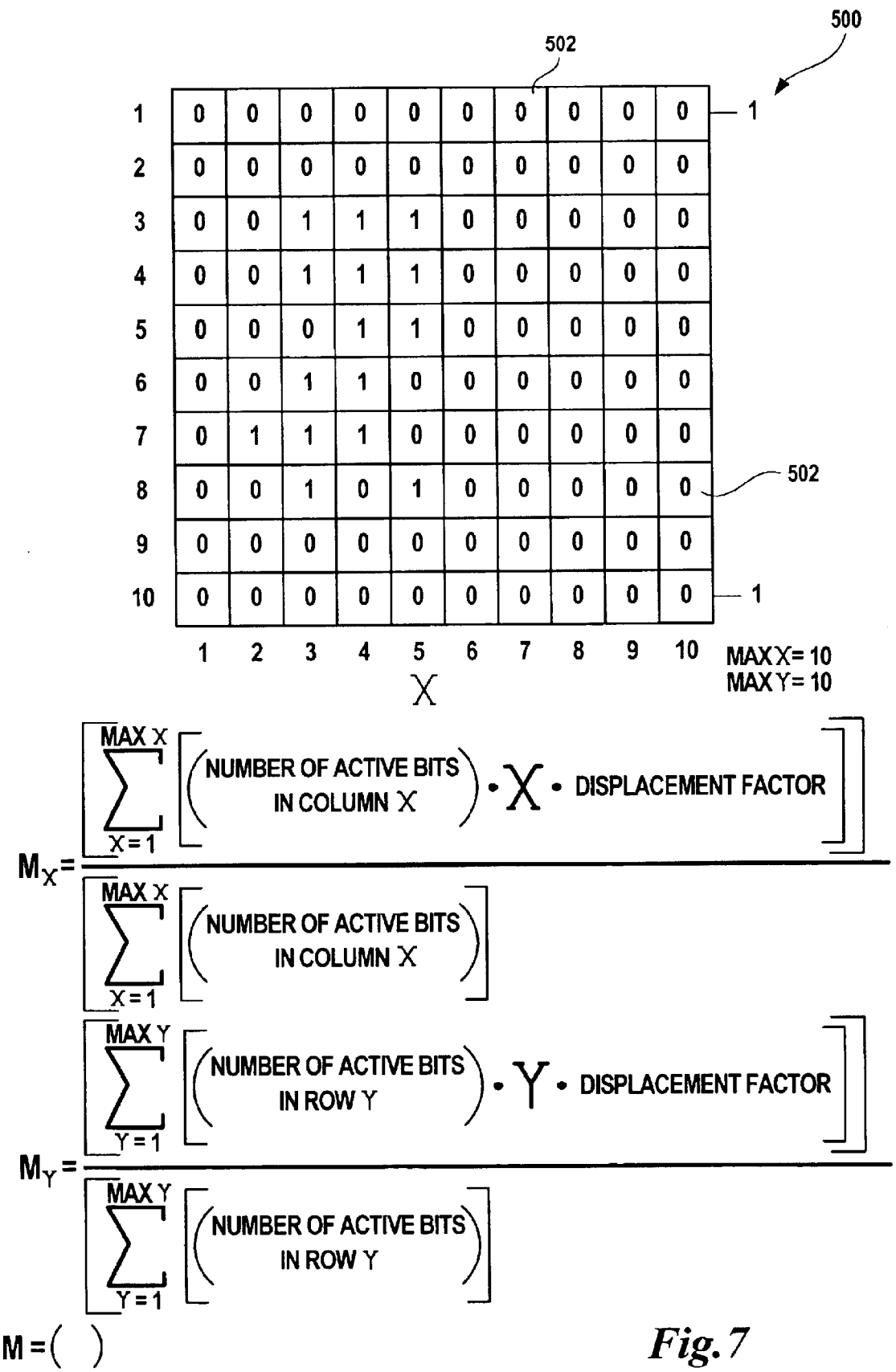
FIG. 7 is a representative diagram of an activity sample comprising a plurality of cells according to the present invention.

FIG. 7 is a representative diagram of an activity sample 500 comprising one hundred cells 502 arranged on 10 rows and 10 columns. Each cell is assigned a binary value to represent the activity flags that were generated by comparing two video image frames. In the example shown, MAX X and MAX Y are equal to ten. The values of $M_x$ and $M_y$ are calculated by the adding the number of active cells in each row and column, multiplying that figure by the corresponding row or column number, and then dividing that number by the total number of active cells. More specifically, in the $M_x$ equation, when X=4, the number of active bits in column X is five. Similarly, in equation My, when Y=8, the number of active bits in row Y is two. Thus, in this example shown, when the formulas are applied to the entire grid, the center of mass is found to be M=30, 42).

The center of mass points, M, do not represent the exact X and Y coordinates of the video image frame because of the displacement factor. However, even though the center of mass points are not actual points on the video image grid, they still accurately measure the relative center of mass points because each center of mass point is only compared with other center of mass points calculated by the same process.

A center of mass point will only be generated from a particular activity sample if the number and configuration of set flags in that particular activity sample meet a predetermined criteria. More specifically, if the system is configured to detect any kind of horizontal movement, the number of set flags in the activity sample must exceed a predetermined number of cells aligned in a vertical direction. If the system is configured to detect any kind of vertical movement, the number of set flags in the activity sample must exceed a predetermined number of cells aligned in a horizontal direction. In this part of the process, the predetermined threshold for the minimum number of cells aligned in the vertical or horizontal direction is two cells. This value can vary up to the total width or height of the screen depending on the desired sensitivity level.

At any step where the processing unit 101 calculates the center of mass values, the process may generate a null center of mass point. Specifically, if there are no active cells found in an activity sample frame or if the size threshold was not met, the process produces a null center of mass point. As described below, these null center of mass points are used in the process to reduce the number of false alarms.

Figure 8:
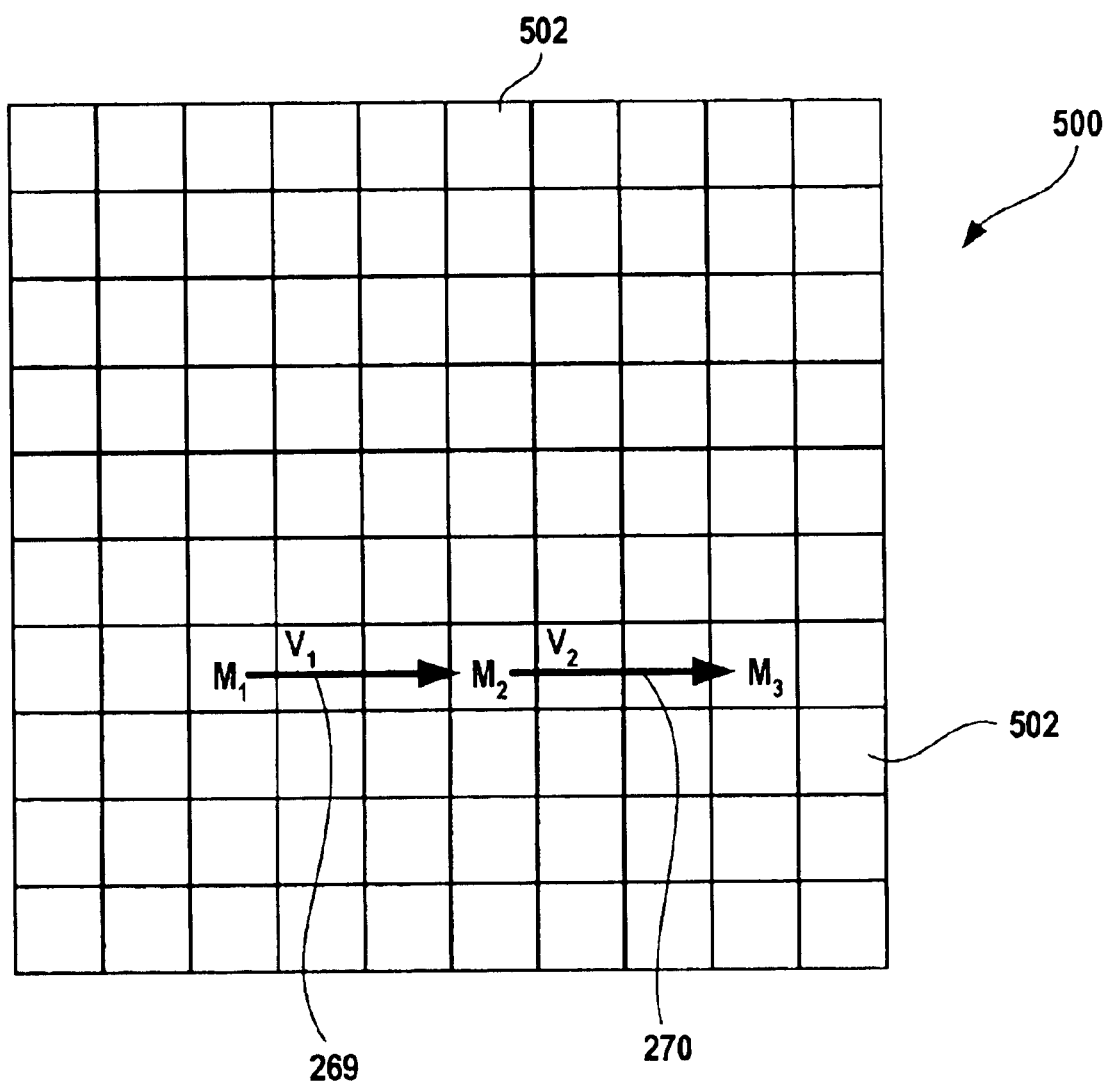
FIG. 8 illustrates a representative video image frame divided into a plurality of cells, two motion vectors, and a plurality of center of mass points.

Returning now to FIG. 5A, after the center of mass has been calculated for each activity sample, processing proceeds to a step 428 where the processing unit 101 then calculates a first direction vector $V_1$ (269 in FIG. 6) from the first two center of mass values $M_1$ 263 and $M_2$ 264. The direction vector is calculated by determining the difference in position of two center of mass values, $M_1$ 263 and $M_2$ 264. FIG. 8 illustrates how a direction vector is calculated from two center of masses. In the example shown, a first center of mass $M_1$ 263 has a value of (3, 7), a second center of mass $M_2$ 264 has a value (6, 7) and a third center of mass has a value (9, 7). A direction vector $V_1$ is calculated by comparing the difference between the center of mass points $M_1$ 263 and $M_2$ 264 and is represented by the character $V_1$. Processing then proceeds to a step 430 where the processing unit 101 then calculates the values for a second direction vector $V_2$ 270 from the other activity samples and center of mass points 265 and 266.

Once the direction vectors have been calculated, processing then continues at a step 432 where the processing unit 101 determines if there is a valid motion in the first vector $V_1$. If the system generated a null center of mass point in the prior steps 422–426, the process continues to a step 442 where the process continues to capture subsequent video image frames. If two center of mass points were detected for the first vector $V_1$, the process continues to a step 434 where the processing unit determines if there is a valid motion in the second vector $V_2$. Here again, the process checks for the creation of two center of mass points for the second vector $V_2$. If there are not two center of mass points for the second vector $V_2$, the process continues to a step 442 to capture a subsequent video frame. If the process detects two center of mass points for the second vector $V_2$, then the process continues to a step 436 to check the direction of the vectors.

At a step 436, the processing unit 101 then compares the movement indicated by the first vector $V_1$ 269 and second vector $V_2$ 270 and determines if the movement is consistent with a user setting. The motion system can be configured by a user to detect seven types of movement. Motion types include: all motion, horizontal motion, vertical motion, left to right motion, right to left motion, top to bottom motion, and bottom to top motion.

If the user has configured the system to detect directional motion, any pair of consecutive vectors that indicate the movement of an object in the same direction triggers an alarm. If the user configures the system to detect horizontal movement, any two vectors that have a horizontal component longer or equal to its vertical component triggers an alarm. If the user configures the system to detect vertical movement, any vector that has a vertical component longer or equal to its horizontal component triggers an alarm. Accordingly, the same rule applies for movement in an up, down, left or right direction. For example, if the system operator configures the system to detect movement in the left direction, a vector must have a horizontal component moving in the left direction greater than or equal to any vertical component. At step 436, if there are at least two vectors moving in a consistent direction, the processing unit then triggers alarm at step 438. Although it is preferred to have at least two vectors moving in a consistent direction to trigger an alarm, a motion system can also be configured to trigger motion utilizing one directional vector.

As indicated by the flow diagram of FIG. 5, if at box 436, the system does not detect any motion, the processing continues to steps 442–462 where the system then continually analyzes subsequent video image frames for any movement. Each step in this loop is carried out in the same manner as the corresponding steps described above.

The above-described example of the directional motion detection process 400 involves the use of an initialization step. More specifically, the first fourteen steps 412–438 preferably capture four video image frames before any calculations or analysis takes place. Although the process requires multiple video image frames to calculate movement of an object in a video image frame, implementation of the directional motion detection process 400 can involve a more iterative design. For example, the process could start at the sampling step 444 and increment the value of X in each sample, thereby skipping the initialization stage of the first fourteen steps 412–438. Although the system may not detect any motion in the first two cycles of boxes 442 through 462, all calculations could be carried out in each iteration. This would simplify the implementation of the program by eliminating the need to code an initialization stage as shown in the first fourteen steps 412–438.

Figure 9:
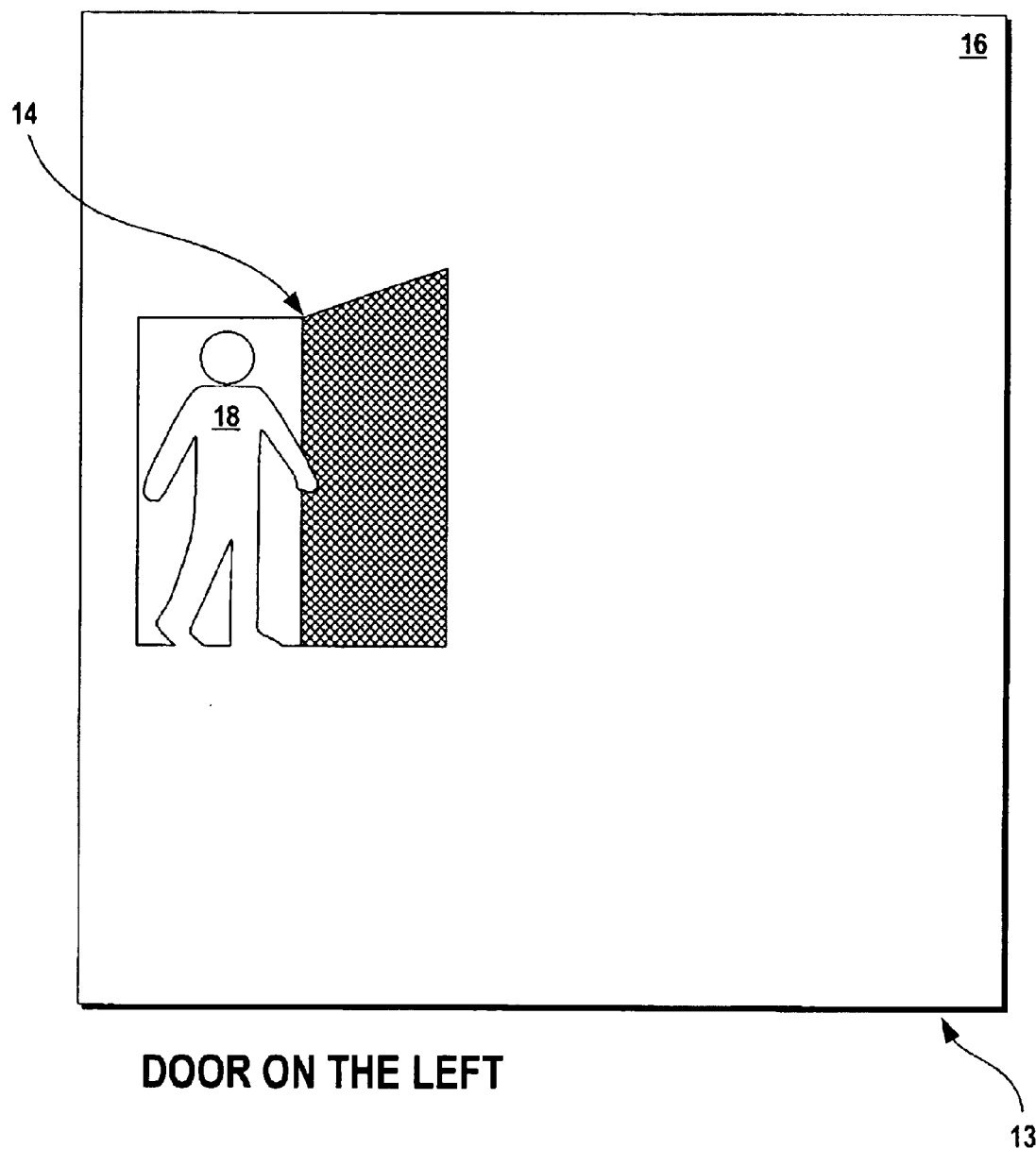
FIG. 9 illustrates a viewing area from a video camera directed into a room.

Installation of the directional motion sensing system 100 requires proper positioning of the video camera (102 of FIG. 1). When the system is set to detect any activity in the camera view, most camera angles will allow the system to efficiently operate. For example, FIG. 9 illustrates a viewing area 13 from the video camera 102 that is aimed into a room 16 with a door 14 positioned on the left side of the viewing area 13. This camera angle is best for detecting general motion activity because the person 18 will trigger the alarm when the system detects movement in any direction. The system can easily detect the movement of a person moving away from the door toward the right side of the camera view or it may detect a person moving from the door towards the camera.

Figure 10A:
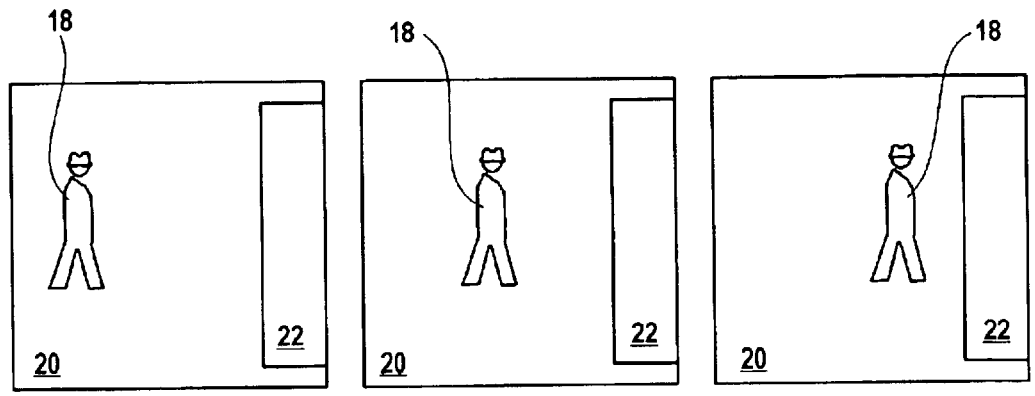
FIG. 10A depicts a series of camera views that are positioned to view a side view of a hallway, a door, and a person walking in a left to right direction.

If the system is configured to detect motion in a specific direction, the camera should be positioned in an area where objects are more likely to move in a horizontal or vertical direction in the camera viewing area. FIG. 10A depicts a series of camera views that are directed towards a side view of a hallway 20, a door 22 and a person 18 walking in a left to right direction towards the door 22. This horizontal camera angle is an example of a desirable camera position for detecting motion in a horizontal direction because the person 18 is more likely to move in a horizontal direction in the video image frame. Accordingly, this angle is also desirable for detecting the movement of targets only moving in a right or left direction.

Figure 10B:
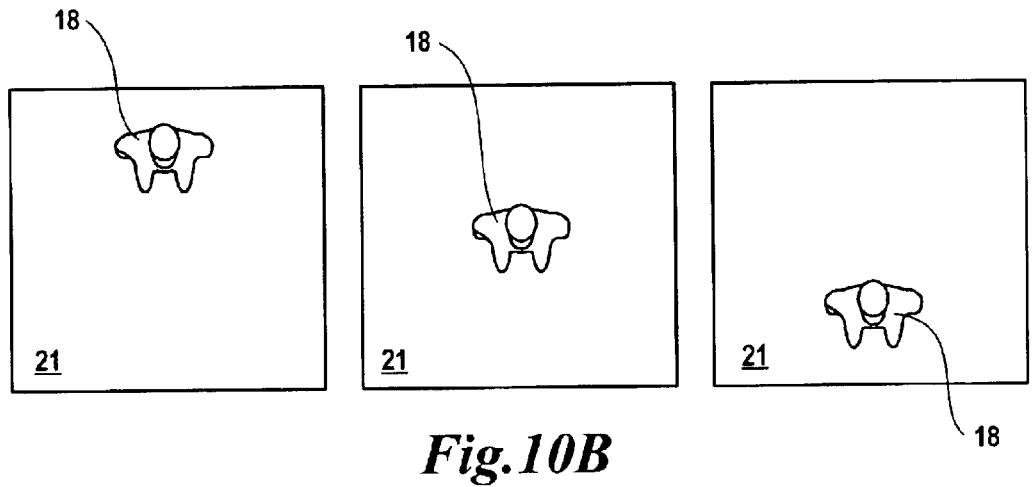
FIG. 10B depicts another series of camera views that are positioned to view a hallway floor and a person moving toward in a downward direction.

FIG. 10B depicts a series of camera views from an overhead camera position directed towards a hall floor 21 and a person 18. This camera angle is desired for detecting motion in any vertical direction because the person 18 is more likely to move in a vertical direction in the video image frame. Accordingly, this angle is also desirable for detecting the movement of targets only moving in an up or down direction.

The camera positions shown in FIGS. 10A and 10B also illustrate two examples of a camera that is positioned at a proper distance from the person 18. In these examples, the distance between the camera and the person 18 is such that it is likely to show some significant movement of the person 18 in each successive video image frame that is sampled from the camera. If the camera is mounted too close, there will not be enough horizontal or vertical motion to trigger the alarm. The most effective camera position also depends on the system threshold settings and the zoom setting of the camera lens. Thus, the optimal camera angle and distance between the target and camera may require testing for each environment.

Figure 10C:
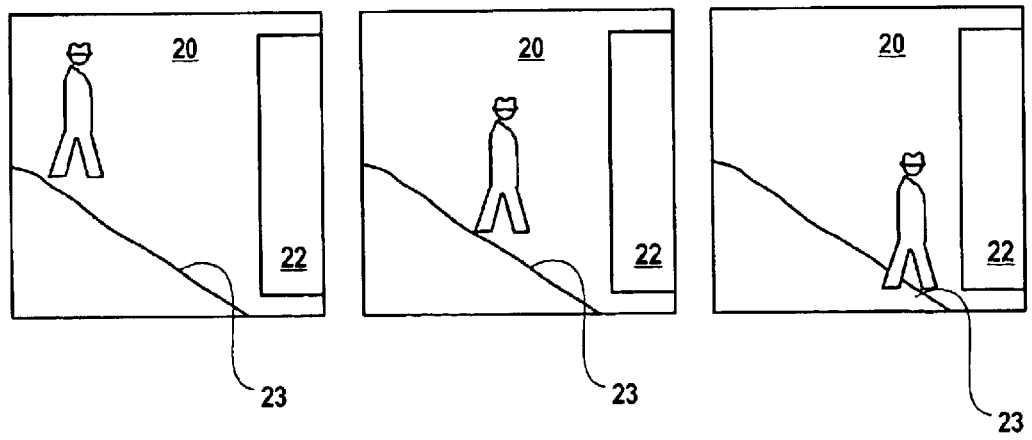
FIG. 10C depicts another series of camera views that are positioned to view a side view of a hallway, a door, and a person walking on a downward slope.

FIG. 10C depicts another series of camera views that are directed toward a side view of a hallway 20, a door 22, a sloped walkway 23, and a person 18 moving down the sloped walkway 23. For systems configured to detect any horizontal or vertical motion, the camera should be positioned to avoid situations where targets are likely to move in diagonal directions. The video image frames depicted in FIG. 10C are examples of a less desirable camera position because it is likely that the persons will move in a diagonal direction. One way to correctly position a camera in a hallway with a sloped walkway is to place the camera in an overhead position as shown in FIG. 10B.

Figure 11:
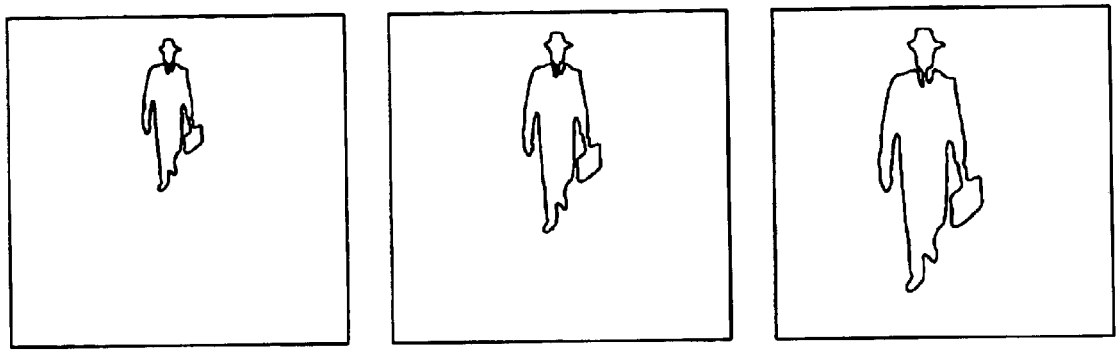
FIG. 11 illustrates a series of camera views from a camera that is directed down the length of a hallway.

FIG. 11 is a series of camera views from a camera that is directed down the length of a hallway. This camera angle is desired when used with two types of motion detection: vertical motion detection or general activity detection with a size parameter filter. The series of frames in FIG. 11 depicts the camera view as a person walks towards the camera. From this angle, there is only a slight vertical motion that may trigger the vertical motion sensor but there is a more significant increase in size. Thus, using activity detection with a size parameter will give much better results in this scenario.

Motion Detection requires time to detect the motion. In some instances, a person may be at the edge of the video image frame when the motion triggers an alarm. In this situation, the person who triggered the alarm may be out of the view by the time an operator hears the alarm. Cameras with a narrow field of view can cause this problem. Thus, it may be appropriate to use more than one camera to generate a much larger viewing space. For example, an arrangement having one camera in a hallway and another camera in an adjoining room can work quite well. Here, the first camera can generate the motion alarm and the camera in the adjoining room can be displayed on a real-time video monitor. This arrangement allows a system operator to increase the sensitivity of the system.

Figure 12:
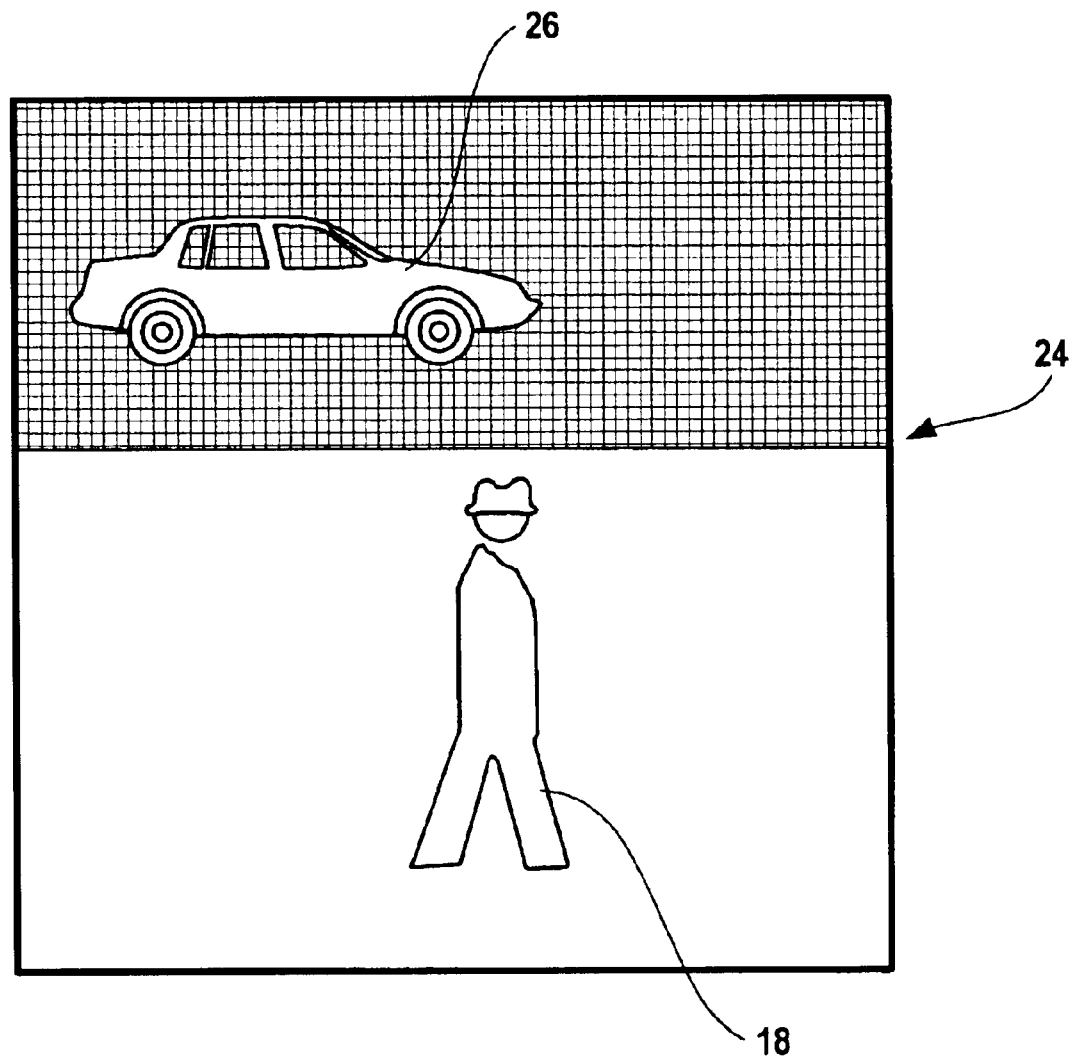
FIG. 12 is a view from a camera directed toward two moving objects.

Another feature of the present invention is the option to digitally block out parts of the viewing area. Since motion detection is looking for the movement of one object, two moving objects in the same image could cause false or missed alarms. An example of this scenario is depicted in FIG. 12. FIG. 12 is a sample camera view directed toward two moving images, a car moving in a path crossing the top half of the video image frame and a person with a path crossing the bottom half of the video image frame. When a car 26 passes in the opposite direction of the person 18, an false alarm may be generated. One way to reduce this problem is to disable a block of cells in the video image frame.

Figure 13:
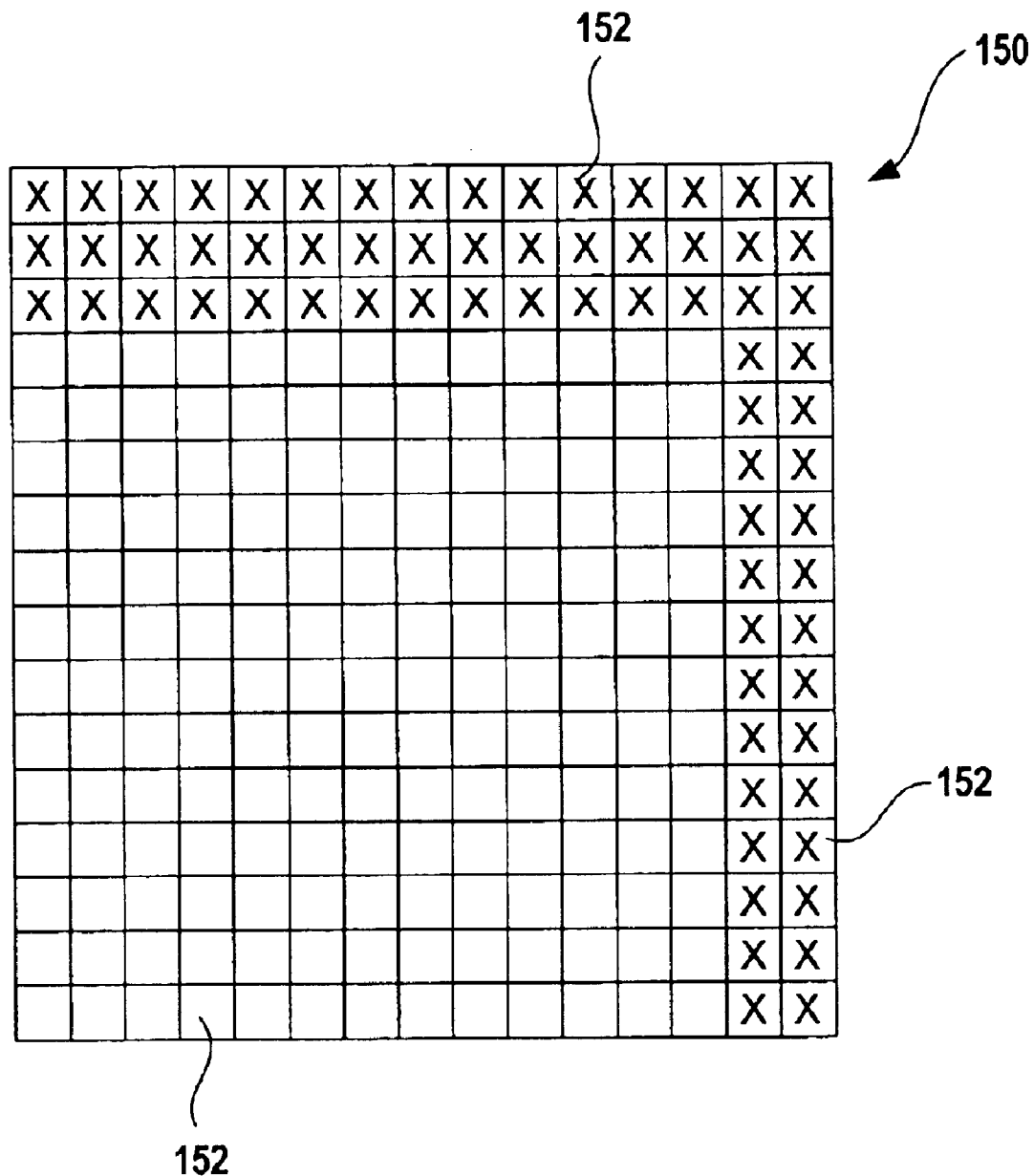
FIG. 13 illustrates a video image frame with disabled cells.

FIG. 13 shows a sample video image frame 150 having a plurality of disabled cells 152 along the top and right edges of the video image screen 150. This cell blocking process allows the directional motion detection system to monitor a camera view with two moving objects, similar to the scenario shown in FIG. 12. If the video image frame of FIG. 13 is superimposed on the video image of FIG. 12, the directional motion detection system is less likely to produce false alarms because the car's movement is behind the blocked cells. When the directional motion detection process (400 of FIG. 5) analyzes each video image frame, it only examines the cells that are not blocked. Thus, false alarms are further reduced from miscellaneous activity captured by the camera.

While the preferred embodiment of the invention has been illustrated and described, it will be appreciated that various changes can be made therein without departing from the spirit and scope of the invention. For example, in the presently preferred embodiment of the invention, motion is detected by comparing the center of mass of the objects in the activity sample frames. However, it is also possible to compute the center of mass of an object from the video image frames directly and to detect movement by comparing changes in the center of mass. Another variation in the scope of the present invention includes the use of only one vector, instead of using two vectors, to verify movement in a specific direction. Furthermore, although the presently preferred embodiment of the invention only looks at sequential video image frames, it may be desirable to compare every other center of mass calculated or other combinations.

What is claimed is:

1. A method of detecting motion in a video surveillance system, comprising:

receiving a plurality of video image frames from a video camera that is positioned to image an object;

comparing a sequence of video image frames to generate a map of differences between sequential video image frames and based on the map of differences, generating a plurality of relative location points for at least one object, wherein each relative location point is based on a center of mass of an individual object;

generating at least one direction vector from the plurality of relative location points, wherein each direction vector indicates a velocity and direction of at least one object;

comparing at least one direction vector with a user defined direction;

determining a horizontal and a vertical component of at least one direction vector; and generating a signal indicative of movement of at least one object if at least one direction vector matches at least one predetermined velocity and at least one predetermined direction wherein the user defined direction is horizontal, wherein the signal is generated if the horizontal component is greater or equal to the vertical component.

2. A computer-readable medium having computer-executable instructions for performing the steps recited in claim 1.

3. A method of detecting motion in a video surveillance system, comprising:

receiving a plurality of video image frames from a video camera that is positioned to image an object;

comparing a sequence of video image frames to generate a map of differences between sequential video image frames and based on the map of differences, generating a plurality of relative location points for at least one object, wherein each relative location point is based on a center of mass of an individual object;

generating at least one direction vector from the plurality of relative location points wherein each direction vector indicates a velocity and direction of at least one object;

comparing at least one direction vector with a user defined direction;

determining a horizontal and a vertical component of at least one direction vector; and generating a signal indicative of movement of at least one object if at least one direction vector matches at least one predetermined velocity and at least one predetermined direction wherein the user defined direction is vertical, wherein the signal is generated if the vertical component is greater or equal to the horizontal component.

4. A computer-readable medium having computer-executable instructions for performing the steps recited in claim 3.

* * * * *